US010379259B2

(12) United States Patent
Kobayashi et al.

(10) Patent No.: US 10,379,259 B2
(45) Date of Patent: Aug. 13, 2019

(54) ESTIMATION APPARATUS, ESTIMATION METHOD, AND COMPUTER-READABLE STORAGE MEDIUM

(71) Applicant: Kabushiki Kaisha Toshiba, Minato-ku (JP)

(72) Inventors: Tetsuya Kobayashi, Yokohama (JP); Aya Namiki, Katsushika (JP); Fumihiko Mizutani, Yokohama (JP); Takahiro Watanabe, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 431 days.

(21) Appl. No.: 15/251,353

(22) Filed: Aug. 30, 2016

(65) Prior Publication Data
US 2017/0199304 A1  Jul. 13, 2017

(30) Foreign Application Priority Data

Jan. 8, 2016 (JP) ................................. 2016-002708

(51) Int. Cl.
*G01W 1/02* (2006.01)
*G01W 1/06* (2006.01)
*G01W 1/10* (2006.01)
*G01W 1/14* (2006.01)
*G01S 13/95* (2006.01)

(52) U.S. Cl.
CPC ............... *G01W 1/10* (2013.01); *G01S 13/95* (2013.01); *G01W 1/14* (2013.01); *G01W 1/02* (2013.01); *G01W 1/06* (2013.01)

(58) Field of Classification Search
CPC ................................. G01W 1/10; G01S 13/95
See application file for complete search history.

(56) References Cited

U.S. PATENT DOCUMENTS 5,839,089 A * 11/1998 Yasuda ................. G01S 13/951
702/3
2004/0043760 A1* 3/2004 Rosenfeld ............... H04L 67/16
455/414.3
(Continued)

FOREIGN PATENT DOCUMENTS

JP  7-110379 A  4/1995
JP  7-110385 A  4/1995
(Continued)

OTHER PUBLICATIONS

Office Action dated Jun. 27, 2017 in Canadian Patent Application No. 2,940,747.
(Continued)

*Primary Examiner* — Michael J Dalbo
(74) *Attorney, Agent, or Firm* — Oblon, McClelland, Maier & Neustadt, L.L.P.

(57) ABSTRACT

An estimation apparatus includes an acquirer, a deriver, and a determiner. The acquirer acquires time-sequential observation data related to cloud-altitude. The deriver derives a first change in cloud altitude from at least a first altitude at a first time and a second altitude at a second time. The deriver derives a second change in cloud altitude from at least a third altitude at a third time and a fourth altitude at a fourth time. The determiner determines a cloud developmental stage based at least in part on the first and second changes in cloud altitude.

8 Claims, 9 Drawing Sheets

(56) References Cited

U.S. PATENT DOCUMENTS

| | | | |
|---|---|---|---|
| 2007/0005249 A1* | 1/2007 | Dupree | G01S 13/89 |
| | | | 702/3 |
| 2011/0234453 A1* | 9/2011 | Mizutani | G01S 13/426 |
| | | | 342/26 R |
| 2013/0158944 A1* | 6/2013 | Hwang | G01C 25/005 |
| | | | 702/150 |
| 2014/0253370 A1 | 9/2014 | Mizutani et al. | |

FOREIGN PATENT DOCUMENTS

| | | |
|---|---|---|
| JP | 11-38154 | 2/1999 |
| JP | 2004-317173 A | 11/2004 |
| JP | 2005-257639 A | 9/2005 |
| JP | 2006-337347 A | 12/2006 |
| JP | 2006337347 A * | 12/2006 |
| JP | 2010-151597 | 7/2010 |
| JP | 2010151597 A * | 7/2010 |
| WO | WO 02/49310 A2 | 6/2002 |

OTHER PUBLICATIONS

Extended European Search Report dated May 12, 2017 in European Patent Application No. 16186596.9.

* cited by examiner

ESTIMATION APPARATUS, ESTIMATION METHOD, AND COMPUTER-READABLE STORAGE MEDIUM

CROSS-REFERENCE TO RELATED APPLICATION

This application is based upon and claims the benefit of priority from Japanese Patent Application No. 2016-002708, filed Jan. 8, 2016; the entire contents of which are incorporated herein by reference.

FIELD

Embodiments of the present invention relate generally to an estimation apparatus, an estimation method, and an estimation compute readable storage medium.

BACKGROUND

An apparatus estimates the conditions of clouds based on meteorological data observed by a radar apparatus. Related art does not estimate the developmental stage of clouds that changes in a short period of time.

DETAILED DESCRIPTION

In some embodiments, an estimation apparatus comprising: but is not limited to: an acquirer configured to acquire at least first and second sets of time-sequential observation data related to cloud-altitude; and a deriver configured to derive at least a first change in cloud altitude from at least a first altitude at a first time and a second altitude at a second time, the first and second times being different from each other, the first altitude and the second altitude being included in the first set of the time-sequential observation data, and the deriver being configured to derive a second change in cloud altitude from at least a third altitude at a third time and a fourth altitude at a fourth time, the third and fourth times being different from each other, the third time being different from the first and second times, the fourth time being different from the first and second times, the third altitude and the fourth altitude being included in the second set of the time-sequential observation data; and a determiner configured to determine a cloud developmental stage based at least in part on the first and second changes in cloud altitude.

In some embodiments, the acquirer is configured to further acquire third and fourth sets of time-sequential observation data related to cloud-altitude, the first and second sets of time-sequential observation data is of a first region, the third and fourth sets of time-sequential observation data is of a second region different from the first region in at least one of latitude and longitude, the first region includes a plurality of first sub-regions aligned in altitude direction, the second region includes a plurality of second sub-regions aligned in altitude direction, the deriver is configured to derive the first and second changes in cloud altitude of the first region, the deriver is configured to further derive a third change of the second region, from at least a fifth altitude at a fifth time and a sixth altitude at a sixth time, the fifth and sixth times being different from each other, the fifth altitude and the sixth altitude being included in the third set of the time-sequential observation data, the deriver is configured to further derive a fourth change of the second region, from at least a seventh altitude at a seventh time and an eighth altitude at an eighth time, the seventh and eighth times being different from each other, the seventh altitude and the eighth altitude being included in the fourth set of the time-sequential observation data, and the determiner is configured to determine the cloud developmental stage based at least in part on the first, second, third and fourth changes in cloud altitude.

In some embodiments, the determiner is configured to determine a cloud-aggregate based at least in part on the first, second, third and fourth sets of time-sequential observation data, the determiner is configured to determine the cloud developmental stage of the cloud-aggregate, based at least in part on the first, second, third and fourth changes in cloud altitude.

In some embodiments, the first time is prior to the second, third and fourth times, and the second time is prior to the third and fourth times, and the third time is prior to the fourth times, the determiner is configured to determine that the cloud developmental stage is a cloud developing stage in a case that the determiner determines that the first change is smaller by at least a first threshold than the second change, and the determiner is configured to determine that the cloud developmental stage is a cloud diminishing stage in a case that the determiner determines that the first change is greater by at least a second threshold than the second change.

In some embodiments, the determiner is configured to determine that the cloud developmental stage is in a most developed stage in a case that the determiner determines that the difference between the first and second changes in cloud altitude is smaller than a smaller one of the first and second thresholds.

In some embodiments, the acquirer is configured to further acquire a fifth set of time-sequential observation data related to cloud-altitude, the deriver is configured to further derive at least a fifth change in cloud altitude from at least a ninth altitude at a ninth time and a tenth altitude at a tenth time, the ninth and tenth times being different from each other, the ninth altitude and the tenth altitude being included in the fifth set of the time-sequential observation data, the ninth time is different from the first, second, third, and fourth times, the tenth time being different from the first, second, third, and fourth times; and the determiner is configured to determine the cloud developmental stage based at least in part on the first, second, and fifth changes in cloud altitude.

In some embodiments, the first set of time-sequential observation data includes first and second echo intensity data related to cloud-altitude, the first echo intensity data indicating a first echo intensity at the first time, the second echo intensity data indicating a second echo intensity at the second time, the deriver is configured to derive, if the acquirer is configured to acquire the first and second echo intensity data which are each greater than a third threshold, at least the first change in cloud altitude from the first and second altitudes.

In some embodiments, the estimation apparatus further comprising: a data generator configured to generate display-data indicating the cloud developmental stage.

In some embodiments, the determiner is configured to determine, based at least in part on at least one: of the first, second, third, fourth altitudes, and the first, and second changes in cloud altitude, a level of heavy rain risk associated with the cloud developmental stage.

In some embodiments, the estimation apparatus further comprising: a data generator configured to generate display-data indicating the level of heavy rain risk.

In some embodiments, the determiner is configured to determine, based at least in part on at least one: of the first, second, third, fourth altitudes, and the first, second, third, and fourth changes in cloud altitude, a level of heavy rain risk associated with the cloud developmental stage for the first region, and based at least in part on at least one of the fifth, sixth, seventh, eight altitudes and the first, second, third and fourth changes in cloud altitude, a level of heavy rain risk associated with the cloud developmental stage for the second region.

In some embodiments, the estimation apparatus further comprising: a data generator configured to generate display-data indicating the level of heavy rain risk.

In some embodiments, an estimation method comprising: acquiring at least first and second sets of time-sequential observation data related to cloud-altitude; and deriving at least a first indicator indicating a first change in cloud altitude from at least a first altitude at a first time and a second altitude at a second time, the first and second times being different from each other, the first altitude and the second altitude being included in the first set of the time-sequential observation data; deriving a second indicator indicating a second change in cloud altitude from at least a third altitude at a third time and a fourth altitude at a fourth time, the third and fourth times being different from each other, the third time being different from the first and second times, the fourth time being different from the first and second times, the third altitude and the fourth altitude being included in the second set of the time-sequential observation data; and determining a cloud developmental stage based at least in part on the first and second indicators.

In some embodiments, a non-transitory computer-readable storage medium that stores a computer program to be executed by a computer to perform at least: derive cloud altitude information from the acquired at least first and second sets of time-sequential observation data related to cloud-altitude; derive at least a first indicator indicating a first change in cloud altitude from at least a first altitude at a first time and a second altitude at a second time, the first and second times being different from each other, the first altitude and the second altitude being included in the first set of the time-sequential observation data, a derive a second indicator indicating a second change in cloud altitude from at least a third altitude at a third time and a fourth altitude at a fourth time, the third and fourth times being different from each other, the third time being different from the first and second times, the fourth time being different from the first and second times, the third altitude and the fourth altitude being included in the second set of the time-sequential observation data; and determine a cloud developmental stage based at least in part on the first and second indicators.

Embodiments of an estimation apparatus, an estimation method, and a non-transitory computer-readable storage medium that stores a computer program to be executed by a computer to perform thereon, are explained with references to the drawings.

(First Embodiment)

Figure 1:
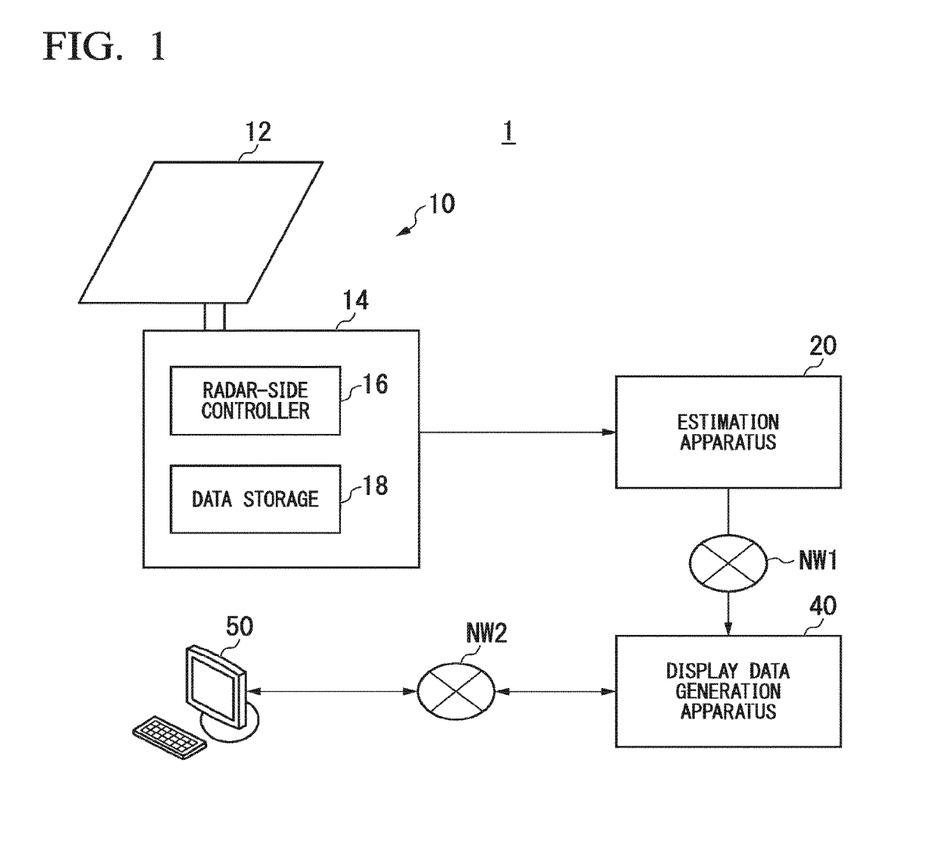
FIG. 1 is a diagram of an estimation system.

FIG. 1 is a diagram of an estimation system 1. The estimation system 1, which includes an estimation apparatus 20, may have a radar apparatus 10, an estimation apparatus 20, and a display data generation apparatus 40, but is not restricted to these elements. The radar apparatus 10, the estimation apparatus 20, and the display data generation apparatus 40 communicate via a network NW1, such a LAN (local area network). The display data generation apparatus 40 communicates with a terminal device 50 via a network NW2, such as a WAN (wide area network).

The radar apparatus 10 includes an antenna 12 and an antenna-side controller 14. The radar apparatus 10 is a meteorological radar that observes, for example, atmospheric conditions, including rain and snow. The antenna 12 is, for example, a phased array antenna, which has a plurality of antenna elements, the directivity of which can be electronically changed. The radar apparatus 10 observes the atmospheric condition in three dimensions, by electronically scanning in the elevation angle direction while being rotationally driven in the horizontal direction of the antenna 12. The antenna 12 transmits and receives radio signals based on control by the antenna-side controller 14.

The antenna-side controller 14 includes a radar-side controller 16 and a data storage 18. The radar-side controller 16 transmits a fan beam having a wide elevation angle beam from the antenna 12. The radar-side controller 16 performs DBF (digital beam forming). When a transmitted fan beam strikes scattering bodies such as rain particles, the returning reflected radio signals are received at one time, and the radar-side controller 16 simultaneously generates observation data (echo intensities) for a plurality of elevation angle ranges. The data storage 18 stores observation data acquired by the radar-side controller 16 and transmits stored data to the estimation apparatus 20.

Cloud, such as cumulonimbus cloud develops rapidly in ten minutes or thirty minutes, while the altitude of cumulonimbus cloud rises continuously and rapidly. After that, cumulonimbus cloud develops gradually, while the altitude of cumulonimbus cloud rises continuously and slowly. Then, cumulonimbus cloud becomes most-developed, with highest altitude. Thereafter, cumulonimbus cloud diminishes rapidly, while the altitude of cumulonimbus cloud drops continuously and rapidly. Then cumulonimbus cloud disappears.

Cumulonimbus cloud has multiple-stages of its life. The multiple-stages of its life include cloud developmental stages. The cloud developmental stages are, for example, a cloud developing stage, a most developed stage, and a cloud diminishing stage. In the cloud developing stage, cumulonimbus cloud develops rapidly, while the altitude of cumulonimbus cloud rises continuously and rapidly. In the most developed stage, cumulonimbus cloud is most-developed, with highest altitude. In the cloud diminishing stage, cumulonimbus cloud diminishes rapidly, while the altitude of cumulonimbus cloud drops continuously and rapidly.

Figure 2:
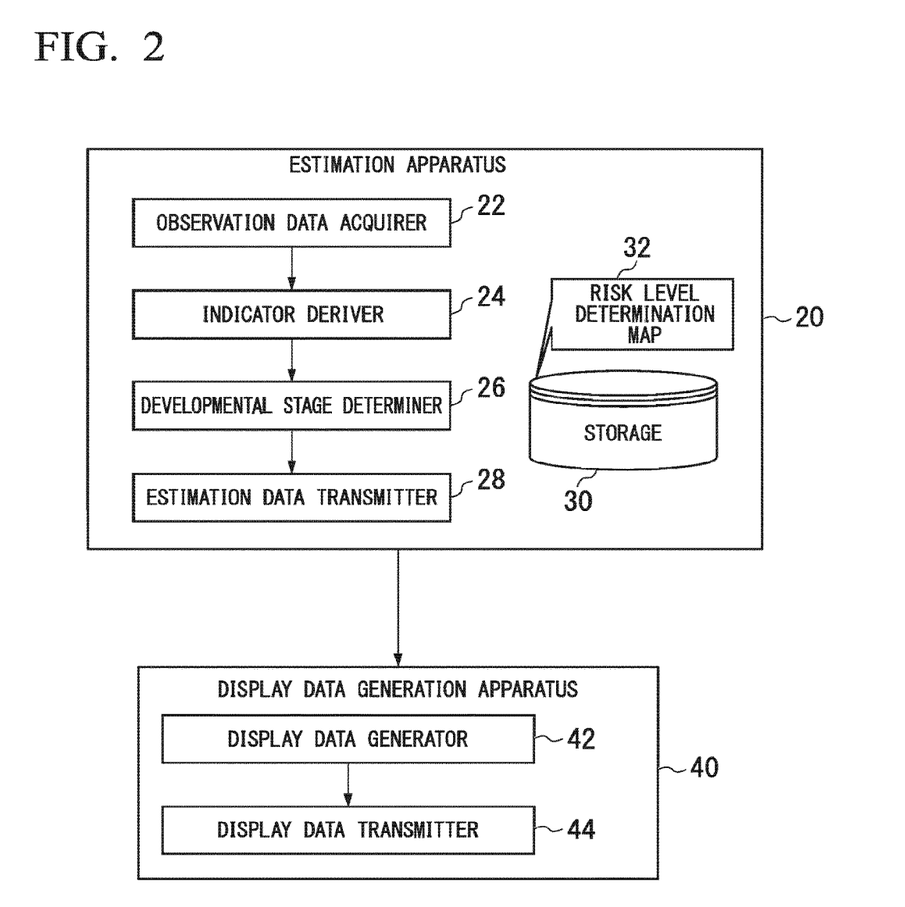
FIG. 2 is diagram of an estimation apparatus and display data generation apparatus.

FIG. 2 is diagram of the estimation apparatus 20 and the display data generation apparatus 40. The estimation apparatus 20 has, for example, an observation data acquirer 22, an indicator deriver 24, a developmental stage determiner 26, an estimation data transmitter 28, and a storage 30, but is not restricted to those elements. The indicator deriver 24 and the developmental stage determiner 26 may be implemented by a processor such as a CPU (central processing unit) executing a program. The indicator deriver 24 and the developmental stage determiner 26 may be implemented by hardware resources, for example, circuitry such as an LSI (large-scale integration) device, an ASIC (application-specific integrated circuit), or an FPGA (field-programmable gate array). The storage 30 may be implemented by, for example, a storage device such as an RAM (random-access memory), a ROM (read-only memory), a hard-disk drive, or a flash memory. The storage 30 stores the below-described risk level determination map 32.

The observation data acquirer 22 communicates wirelessly or by cable and acquires observation data from the radar apparatus 10. The observation data acquirer 22 acquires observation data (time-sequential observation data) at at least two different times from the radar apparatus 10 and stores the acquired observation data in the storage 30. The estimator 20 may be formed as one with the radar apparatus 10, in which case the observation data acquirer 22 uses a communication bus within the apparatus to acquire observation data from the data storage 18.

The indicator deriver 24, based on the observation data acquired by the observation data acquirer 22, derives cloud elevation information (to be described later). The indicator deriver 24, based on the derived cloud elevation information, derives an indicator that indicates a change in the cloud elevation.

The developmental stage determiner 26, based on the indicator derived by the indicator deriver 24, determines the cloud life stage (developmental stage). The cloud developmental stage includes such stages as a stage during which clouds are developing, a stage of peak development, in which development has stopped and change is small, and a stage in which clouds are in the process of diminishing. the indicator deriver 24 is one example of the "deriver" in the attached claims. the developmental stage determiner 26 is one example of the "determiner" in the attached claims. The estimation data transmitter 28 transmits an estimation result determined by the developmental stage determiner 26 to the display data generation apparatus 40. The estimation data transmitter 28 stores an estimation result determined by the developmental stage determiner 26 in the storage 30.

The display data generation apparatus 40 may include a display data generator 42 and a display data transmitter 44, but is not restricted to these elements. The display data generator 42, based on the estimation result transmitted from the estimation data transmitter 28, generates display data (image data) for displaying information including the estimation results on the display of the terminal device 50. The display data transmitter 44 transmits the display data generated by the display data generator 42 to the terminal device 50. The display data generator 42 and the display data transmitter 44 are an example of the "display information generator" in the attached claims.

Figure 3:
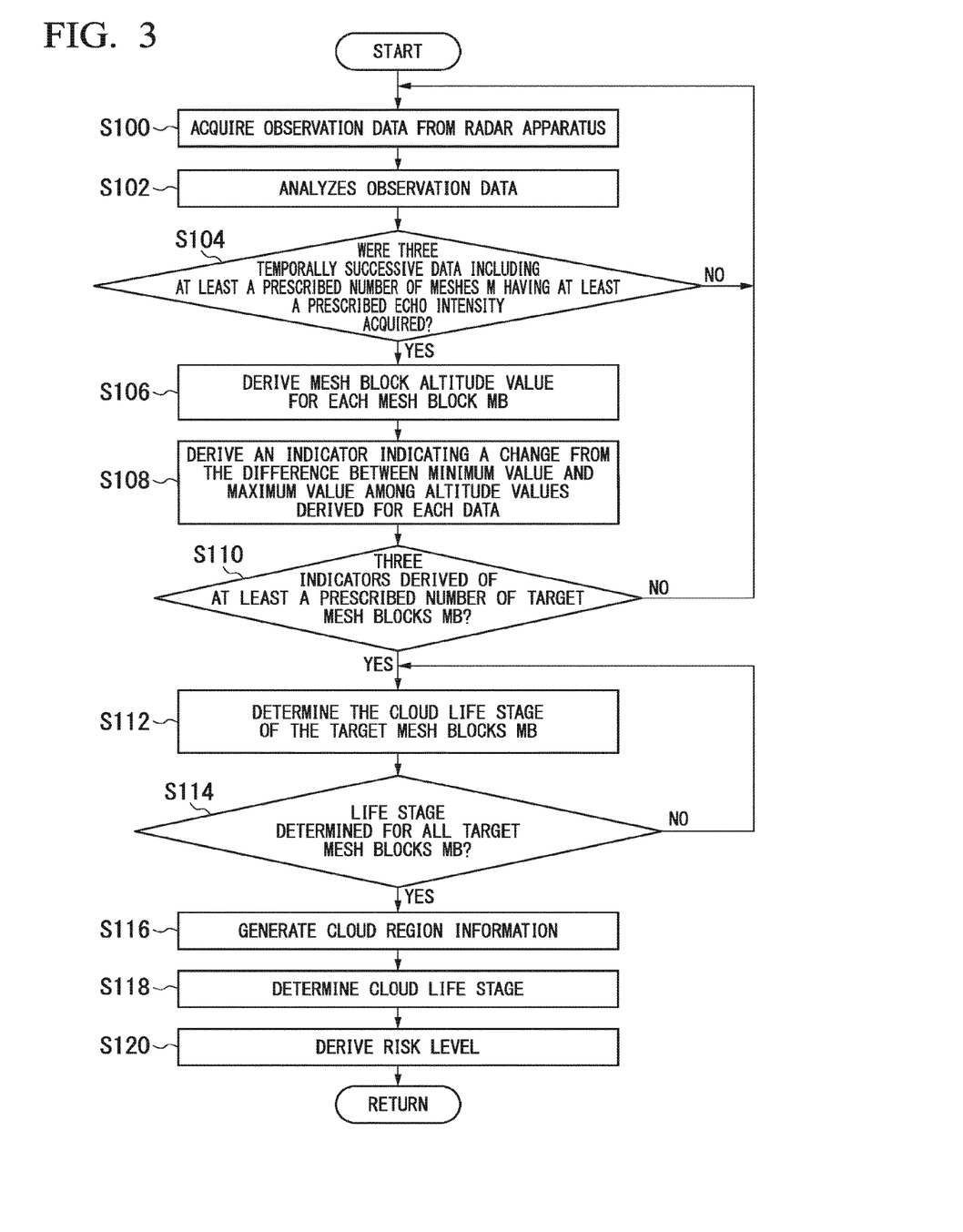
FIG. 3 is a flowchart illustrating the flow of processing executed by the estimation apparatus.

FIG. 3 is a flowchart illustrating the flow of processing executed by the estimation apparatus 20. First, the observation data acquirer 22 acquires the observation data D transmitted from the data storage 18 of the radar apparatus 10 (step S100). The observation data D is information regarding a mesh (to be described later) and the echo intensities acquired by the radar apparatus 10 for each observation period. The echo intensity is an example of information for determining whether there are clouds or precipitation particles. The observation data D is not restricted to information indicating the echo intensity, and may be information by which the indicator deriver 24 can judge whether there are clouds or precipitation particles, or information from which can be derived the elevation value (to be described later) of a mesh block MB, to be described later.

The observation data D may be pre-established data taken to be a reference on land (for example, on the land on which the radar apparatus 10 is installed), or data taken to be sea level (elevation above sea level). If the radar apparatus 10 has a function of recognition position such as in the GPS (global positioning system), the position information of the radar apparatus 10 may be included in the observation data D. The indicator deriver 24 may, based on the position information of the radar apparatus 10 or the like, correct the observation data D and derive an elevation value as the reference on land or at sea.

Figure 4:
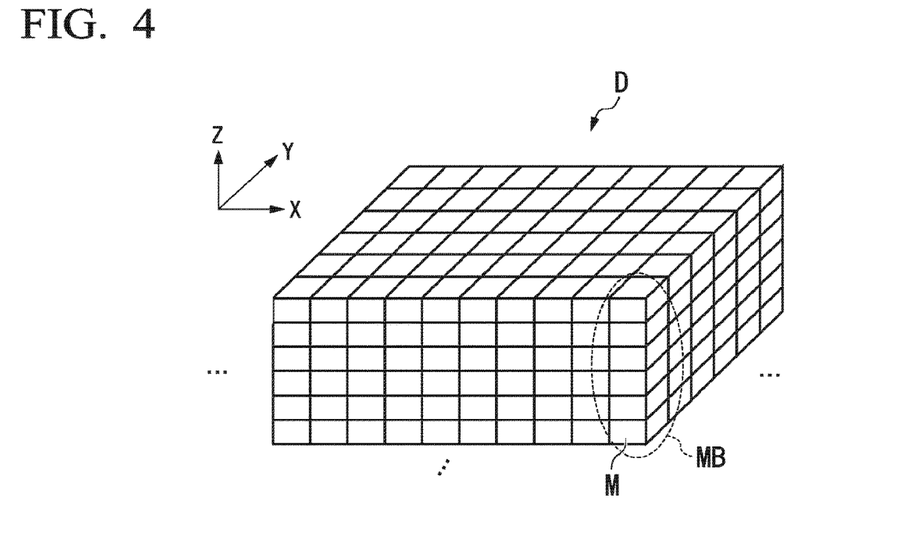
FIG. 4 is a diagram illustrating observation data D.

FIG. 4 is a diagram illustrating observation data D. In the following, the XYZ coordinates will be used in the description, as necessary. The antenna 12 of the radar apparatus 10 is driven in the horizontal direction, and the observation data D is acquired between the drive starting point and ending point. The observation data D acquired between the starting point and ending point of the drive is the observation data acquired in one period. The meshes M are sub-regions that is divided in the distance direction (Y direction), the azimuth direction (X direction), and the height direction (Z direction) in prescribed widths each. In the example illustrated, because the observation data D is for a position that is sufficiently distant from the radar apparatus 10, a mesh M is approximated by a cube. A set of meshes M among which the horizontal directions (distance direction and azimuth direction) are the same and only the altitude (vertical direction) differs will be called a "mesh block" (MB). The mesh block MB is an example of a "first region (or second region) having a common horizontal direction (a common latitude and longitude) position."

Next, the indicator deriver 24 analyzes the observation data D for each mesh M (step S102). The indicator deriver 24, for example, determines from among the observation data D, whether the echo intensity of each individual mesh M is at least a prescribed echo intensity. If an echo intensity of at least the prescribed echo intensity is included in a mesh M, because that mesh M includes a scattering bodies (water drops or ice crystals) exceeding some size, the indicator deriver 24 determines that there is a possibility that a cloud exists in that mesh M.

Next, the indicator deriver 24 determines whether or not three successive data, observed by the radar apparatus 10 and exceeding a prescribed echo intensity, have been acquired in temporal sequence from among at least a prescribed number of meshes M in the observation data D for the same mesh block MB (step S104).

If three successive data exceeding a prescribed echo intensity have been acquired in temporal sequence from among at least a prescribed number of meshes M in the same mesh block MB, the indicator deriver 24 derives the mesh block MB altitude value (altitude information) for each mesh block MB, regarding each of the three temporally successive data exceeding a prescribed number of meshes M in which the echo intensity is at least the prescribed echo intensity (step S106). The altitude value of a mesh block MB is the altitude of the mesh M, from among the meshes M included in the mesh block MB, having the highest altitude from among meshes M that have been determined to have the possibility of the existence of a cloud.

Not restricted to the case in which three successive data of at least a prescribed echo intensity in a temporal sequence among at least a prescribed number of meshes M in the same mesh block MB are acquired, in the case in which two or more successive data in a temporal sequence of at least a prescribed number of meshes M having echo intensities of at least a prescribed echo intensity in the same mesh block MB are acquired, the indicator deriver 24 may execute processing to derive the mesh block MB altitude value (altitude information) regarding each of the at least two successive data(a first altitude at a first time and a second altitude at a second time, or a third altitude at a third time and a fourth altitude at a fourth time)from among at least a prescribed number of meshes M in a temporal sequence, having at least echo intensities of a prescribed echo intensity, and the processing thereafter.

If three successive data of at least a prescribed echo intensity in a temporal sequence in meshes M in the same mesh block MB were not acquired, return is made to step S100. In this manner, by not performing processing when data of at least a prescribed echo intensity is singularly acquired in the same mesh block MB, it is possible to reduce the increasing of the processing burden and the power consumption.

Figure 5:
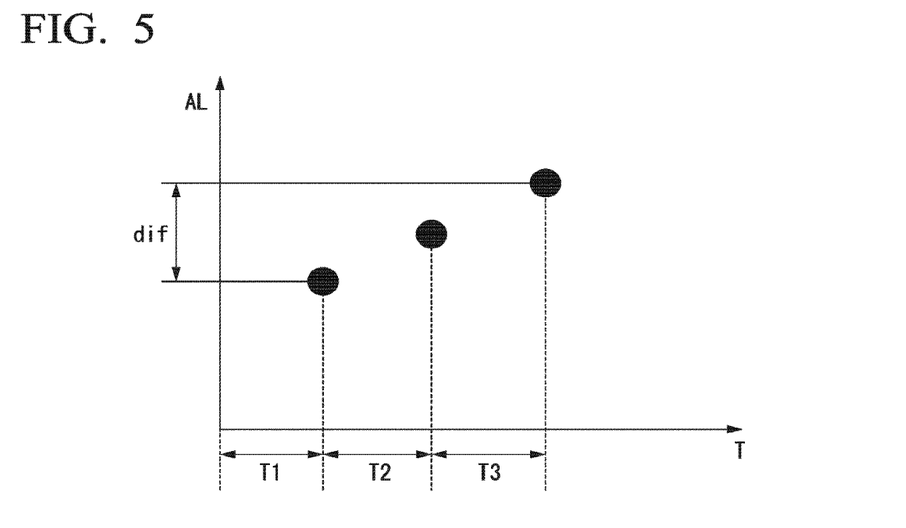
FIG. 5 is a diagram illustrating the maximum and minimum values of altitude.

Next, the indicator deriver 24, for each of the data, derives from the difference between the maximum value and the minimum value of the altitude values of the derived mesh block MB an indicator indicating a change (step S108). For example, the indicator deriver 24 derives an indicator for each of the derived mesh blocks MB. FIG. 5 is a diagram illustrating the maximum and minimum values of altitude, in which the vertical axis represents the altitude value (AL), and the horizontal axis represents time (T). The figure shows the altitude values observed in the mesh block MB at each of the first period (T1), the second period (T2), and the third period (T3), which are temporally contiguous period. For example, the indicator deriver 24 derives as the indicator the difference (dif) between the maximum value and the minimum value of altitude value from among the first period to the third period. The indicator deriver 24 may derive the indicator of the mesh block MB by dividing the derived difference by the value of the acquired space (for example, one period space) of the observation data D. The indicator may be derived if the maximum value exists in at least two periods of the first period to the third period. In this case, a mesh block MB for which an indicator is not derived is excluded from the mesh blocks MB (hereinafter referred to as the target mesh blocks MB) that are the targets for cloud life stage estimation (which are described later).

Next, the indicator deriver 24, by executing step S108 three times, determines whether or not three indicators (first, second, and fifth indicator) have been derived in at least a prescribed number of target mesh blocks MB (step S110) If three indicators have been derived in at least a prescribed number of target mesh blocks MB, processing proceeds to step S112, and if three indicators have not been derived in at least a prescribed number of target mesh blocks MB, processing proceeds to step S100. At step S110, the indicator deriver 24 may determine whether or not an arbitrary number of two (a first indicator and second indicator) or more indicators have been derived and, based on the determination result, may proceed to step S112.

Next, the developmental stage determiner 26, based on the three indicators derived by the processing at step S108, determines the cloud life stage of the target mesh blocks MB (Step S112). The developmental stage determiner 26, for example, determine the cloud life stage as one of the four stages of "developing stage," "most-developed stage," "diminishing stage," and "other," which is not classified into any of "developing stage," "most-developed stage," and "diminishing stage." At step S112, the developmental stage determiner 26 may, based on an arbitrary number of two or more indicators, determine the cloud life stage of the target mesh blocks MB.

For example, if the indicator increases by at least a prescribed width continuously for some time (for example, approximately several minutes), the developmental stage determiner 26 determines that the cloud life stage is "developing." For example, if the indicator decreases by at least a prescribed width continuously for some time, the developmental stage determiner 26 determines that the cloud life stage is "diminishing." If the indicator is confined to within a prescribed range, the developmental stage determiner 26 determines that the cloud life stage is "most-developed stage." For example, if the indicator does not correspond to the above-described conditions, the developmental stage determiner 26 determines the cloud life stage to be "other," which is not classified into any of "developing stage," "most-developed stage," and "diminishing stage."

Figure 6:
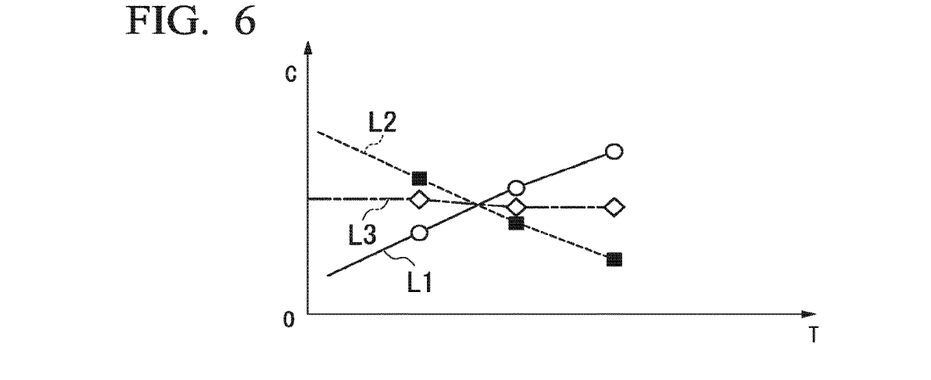
FIG. 6 is a diagram illustrating how the developmental stage determiner determines the life stage.

FIG. 6 is a diagram illustrating how the developmental stage determiner 26 determines the life stage. The vertical axis represents the indicator, and the horizontal axis represents time. For example, if the index, as shown by the trend line L1, continuously rises in the positive direction over time by at least a prescribed width, the developmental stage determiner 26 determines that the life stage in that mesh block MB is "developing stage." The prescribed width is set to a value of 200, 250, or 300 m/minute. For example, Determiner 26 determines that the cloud developmental stage is a cloud developing stage in a case that the determiner 26 determines that the first change (first indicator) is smaller by at least a first threshold than the second change (second indicator).

For example, if the index, as shown by the trend line L2, continuously decreases in the negative direction over time by at least a prescribed width, the developmental stage determiner 26 determines that the life stage in that mesh block MB is "diminishing stage." The prescribed width may be set to a width the same as or different from that of the developing stage determination criterion. For example, determiner 26 determines that the cloud developmental stage is a cloud diminishing stage in a case that the determiner 26 determines that the first change (first indicator) is greater by at least a second threshold than the second change (second indicator).

If the indicator, as shown by the trend line L3, is confined within a prescribed range, the developmental stage determiner 26 determines that the cloud life stage is "most-developed stage." This prescribed range may be set to a range the same as or different from that of the developing stage determination criterion. For example, determiner 26 determines that the cloud developmental stage is in a most developed stage in a case that the determiner 26 determines that the difference between the first and second changes (indicator) is between the first and second thresholds.

Next, the developmental stage determiner 26 determines whether or not the life stage has been determined for all the target mesh blocks MB (step S114). If the life stage has been determined for all the target mesh blocks MB, processing proceeds to step S116, and if the life stage for all target mesh blocks MB has not been determined, processing proceeds to step S112.

Next, the developmental stage determiner 26 generates cloud region information of an aggregate of clouds formed by a plurality of clouds (step S116). For example, the developmental stage determiner 26 takes a region in which clouds neighboring in a linked stream in at least a prescribed number of meshes M that include data of at least a prescribed echo intensity to be a cloud region.

The developmental stage determiner 26 may determine a cloud region by the following method. For example, in addition to the echo intensity from the radar apparatus 10, the developmental stage determiner 26 may acquire the received frequency or amount of change thereof of the transmitted frequency. The developmental stage determiner 26, using the Doppler principle, acquires the velocity information of scattering bodies (rain particles), based on the acquired amount of change. The developmental stage determiner 26, based on the velocity information of the scattering bodies, determines the motion of the rain particles in the atmosphere. From the determined movement of rain particles, the developmental stage determiner 26 derives an determined region having an updraft by estimating the manner of the wind surrounding the rain particles. If a derived region having an updraft satisfies a prescribed condition, the developmental stage determiner 26 determines that a cloud aggregate (cumulonimbus cloud) exists or is forming in the collection of the regions. For example, if the range of an updraft or the size and the like of the echo intensity in the updraft exceeds a prescribed threshold, the developmental stage determiner 26 determines that a cloud aggregate exists or is forming in the region.

Figure 7:
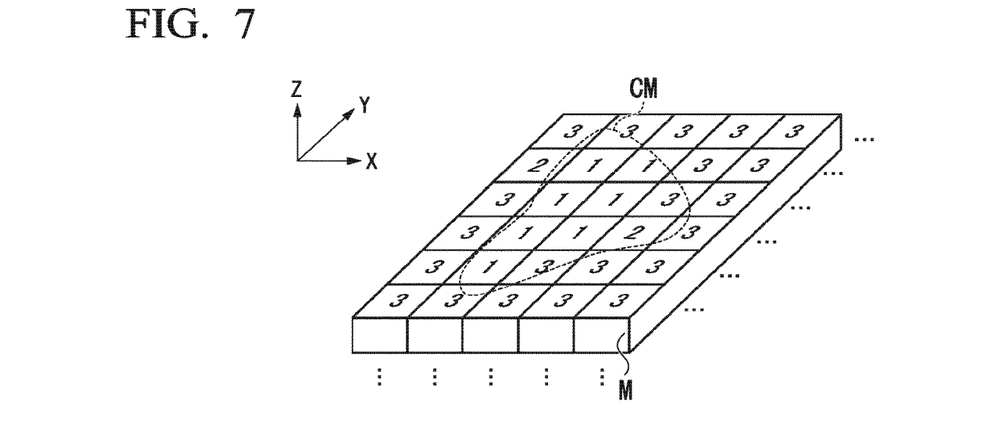
FIG. 7 is a diagram illustrating the estimation of the life stage.

Next, the developmental stage determiner 26 determines the life stage with respect to cloud region information (step S118). The developmental stage determiner 26, based on the life stage of each mesh block MB determined at step S112, determines the life stage corresponding to the cloud region information. FIG. 7 is a diagram illustrating the life stage estimation. The numbers in the drawing indicate the life stage of the mesh blocks MB determined at step S112. In the example illustrated, the developing stage, the diminishing stage, and the most-developed stage are indicated by 1, 2, and 3, respectively.

The developmental stage determiner 26, for example, of the life stages corresponding to the mesh blocks MB included in a cloud region CM of the cloud region information generated at step S116, determines most numerous of the life stages as the life stage of that cloud region CM. In the illustrated example, in the cloud region CM, because the number of mesh blocks MB corresponding to the developmental stage 1 is the highest, the developmental stage determiner 26 determines that the life stage of the collection of cloud aggregates corresponding to the cloud region CM is the developing stage.

The developmental stage determiner 26 may be configured to determine the life stage of the cloud region CM by supplying the value quantifying that is associated with the life stage for each mesh block MB and dividing that by the number of mesh blocks MB included in the overall cloud region CM. The developmental stage determiner 26 may determine the life stage regarding a plurality of cloud regions, and may be configured to determine the life stage regarding an arbitrary cloud region of a plurality of cloud regions.

In the cloud region CM, if the number of mesh blocks MB determined to be in the developing life stage is the same as the number of mesh blocks MB determined to be in the most-developed life stage, the developmental stage determiner 26 may be configured to determine the life stage of the cloud aggregate corresponding to the cloud region CM to be the developing stage.

In the cloud region CM, if the number of mesh blocks MB determined to be in the most-developed life stage is the same as the number of mesh blocks MB determined to be in the diminishing life stage, the developmental stage determiner 26 may be configured to determine the life stage of the cloud aggregate corresponding to the cloud region CM to be the most-developed stage.

In the cloud region CM, if the number of mesh blocks MB determined to be in the developing life stage is the same as the number of mesh blocks MB determined to be in the diminishing life stage, the developmental stage determiner 26 may be configured to determine the life stage of the cloud aggregate corresponding to the cloud region CM to be the developing stage.

In this manner, the cloud region CM, if the numbers of mesh blocks MB corresponding to differing life stages are the same, the developmental stage determiner 26 determine the developmental stage in the direction that increases the priority level of a level that is close to the forming stage of the developmental stages. If the user is provided with information that includes estimation results that increase the priority level of a stage close to the forming stage, the trend becomes one of calling for the attention of the user and brings attention to evacuation. As a result, it is possible to determine forming stage on the safe side.

Next, the developmental stage determiner 26 derives the risk level of a cloud aggregate for which the life stage has been determined causing heavy rain (step S120). By doing this, the processing of this flowchart ends. For example, the greater is the altitude value of the mesh block MB included in the cloud region CM and the greater is the rate of change of the altitude value, the higher is the risk level of the mesh block MB that the developmental stage determiner 26 determines. The developmental stage determiner 26 integrates the risk levels of mesh blocks MB included in the cloud region CM and derives the risk level of the cloud region CM. For example, the developmental stage determiner 26 references a risk level determination map 32 stored in the storage 30 and determines the risk level for each mesh block MB.

Figure 8:
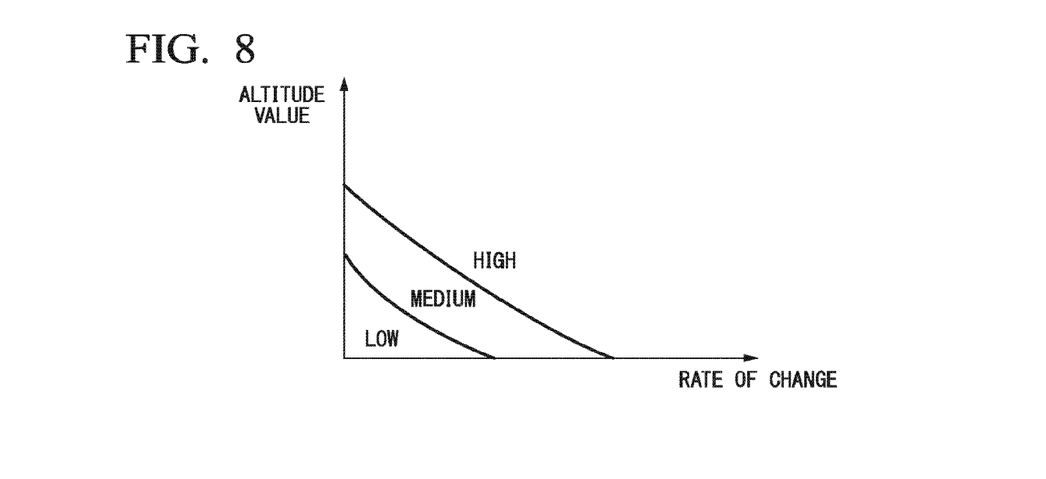
FIG. 8 is a diagram illustrating an example of a risk level determination map.

FIG. 8 is a diagram illustrating an example of a risk level determination map 32. In the risk level determination map 32, the risk level is associated with the altitude value and the rate of change. As shown, in the risk level determination map 32, the higher is the altitude value of a mesh block MB and the larger is the rate of change of the altitude value of the mesh block MB, the higher is the derived risk level. The developmental stage determiner 26 references the risk level determination map 32 and, based on the altitude values and rates of change of each mesh block MB within a cloud region, determines the risk level of each mesh block MB.

The developmental stage determiner 26 then derives the average value of the risk levels derived for each mesh block MB of a plurality thereof or the number of the most numerous class of derived risk level as the risk level of the cloud region CM.

The developmental stage determiner 26 may take into account the determined developmental stage of each cloud CM in deriving the risk level. For example, the developmental stage determiner 26 may be configured to set coefficients for developing stage, the diminishing stage, and the most-developed stage and multiply, add to, or perform another calculation with respect to values corresponding to the risk levels derived using the risk level determination map 32 and the like to derive the ultimate risk level. For example, the coefficients can set in decreasing sequence of the developing stage, the most-developed stage, and the diminishing stage. This enables the developmental stage determiner 26 to more accurately derive the level of risk of cloud aggregate causing heavy rain.

The altitude value when the risk level is derived may be taken as being referenced to a pre-established land surface, or referenced to a sea surface (elevation above sea level).

Figure 9:
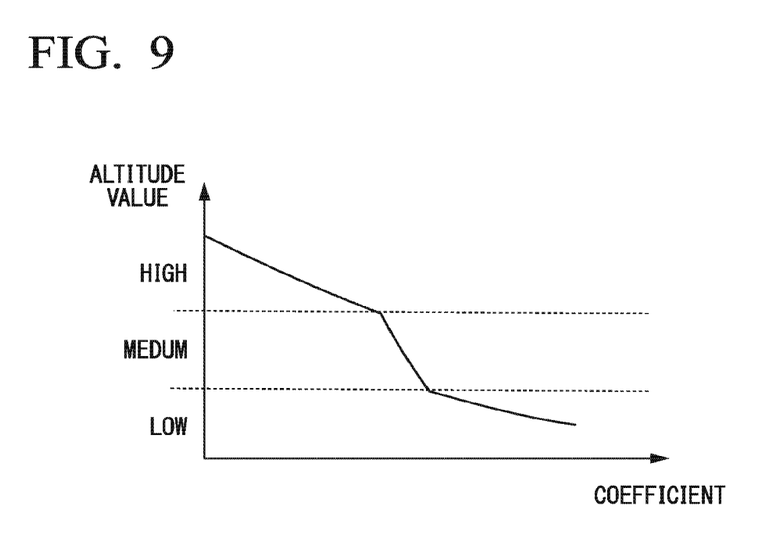
FIG. 9 is a diagram illustrating an example of altitude correction map, in which there is mutual correspondence made between the altitude value and a coefficient.

The altitude value when the risk level is derived may be the altitude value after correction in accordance with an altitude correction map. FIG. 9 is a diagram illustrating an example of altitude correction map, in which there is mutual correspondence made between the altitude value and a coefficient (for example, a value of 1 or smaller). In the altitude correction map, the coefficient is set so as to trend upward as the altitude value decreases. For example, at a high altitude value, the coefficient is smaller than at a medium altitude value or a low altitude value. The coefficient is set to be lower at a medium altitude value than at a low altitude value. For example, the developmental stage determiner 26 references the altitude correction map and, if the altitude value is high, makes correction so that, compared to when the altitude value is low, the rate of decrease of the altitude value is larger.

A correction value may be associated with each individual mesh block MB and the developmental stage determiner 26 may be configured to derive the risk level taking into account the correction value associated with the mesh block MB. For example, in a region included in a mesh block MB, if there exists a region in which the ground is weak or if there is a high possibility of a change in the ground, such as a land sinking or landslide caused by heavy rain, this can be associated with the correction value for that mesh block MB being set to be larger than a correction valued associated with other mesh blocks MB. The risk level derived for a mesh block MB associated with a large correction value tends to be larger. As a result, the developmental stage determiner 26 can derive a risk level that reflects the characteristics of the ground.

Figure 10:
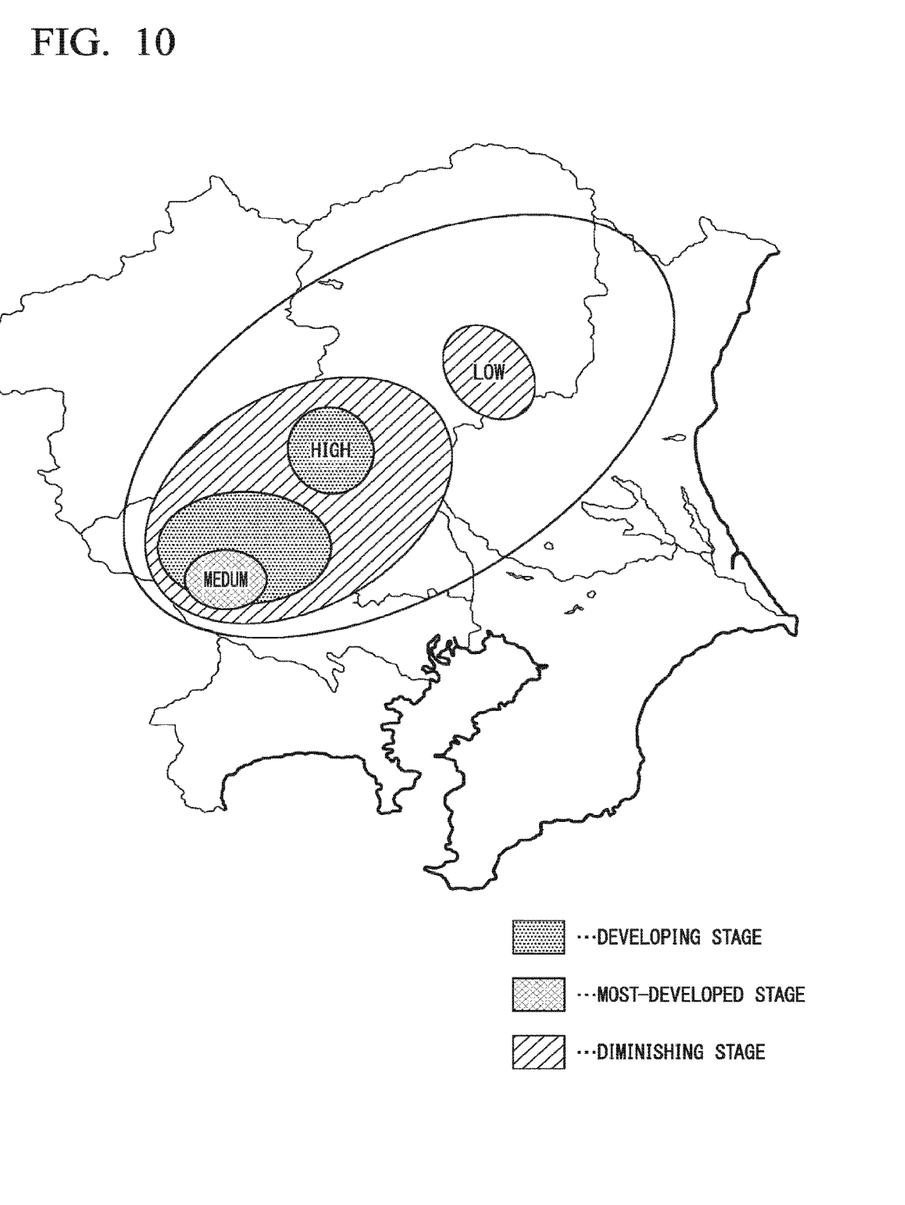
FIG. 10 is a diagram illustrating an example of an image displayed on the display of the terminal device.

The display data generator 42 generates display data showing the cloud life stage or the risk level. The display data transmitter 44 transmits the display data generated by the display data generator 42 to the terminal device 50. FIG. 10 is a diagram illustrating an example of an image displayed on the display of the terminal device 50. The display of the terminal device 50 displays information transmitted by the display data transmitter 44. In the display of the terminal device 50, for example, cloud regions, the risk levels thereof (high, medium, low), and information as to whether the developmental stage of the clouds is developing, diminishing, or most-developed are overlaid onto map information. The information regarding life stage is displayed, for example, in a form enabling distinction by colors, and the information regarding the risk level is displayed, for example, as text information. The display of the terminal device 50 may be configured to omit a part of the information regarding the cloud regions, the risk levels thereof, and the cloud life stages. For example, in the display of the terminal device 50, the cloud risk levels only or the life stage information only may be displayed overlaid onto the map information.

The display data generator 40 may wirelessly communicate with a mobile terminal. The mobile terminal is a smartphone or a tablet terminal that includes a display. The mobile terminal, based on display data transmitted from the display data generator 40, displays on its display the image shown in FIG. 10.

Figure 11A:
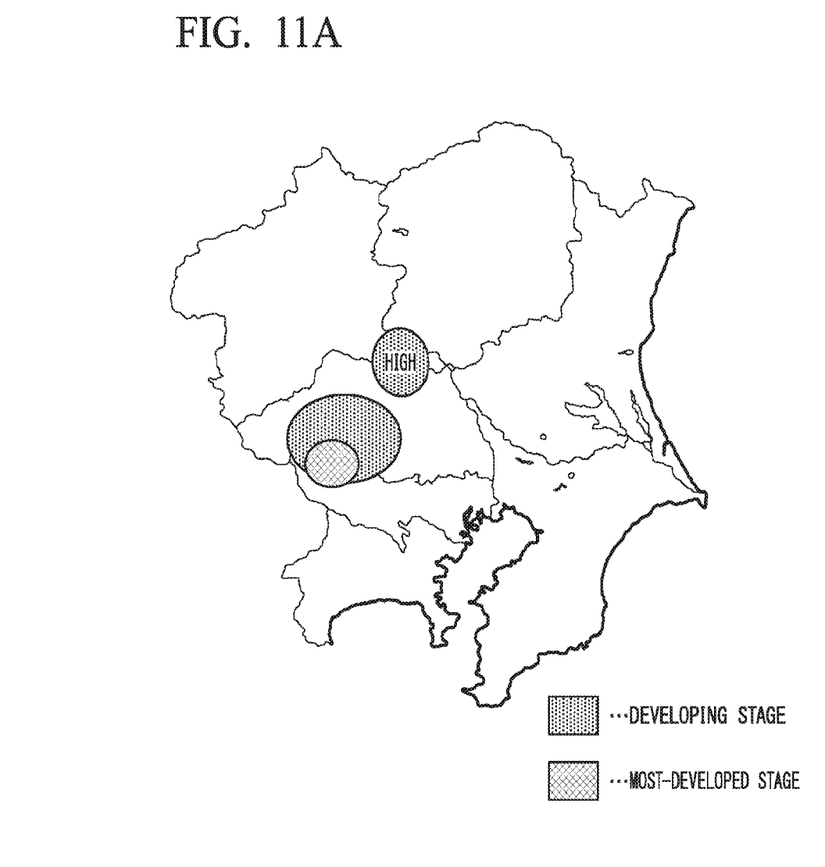
FIGS. 11A and 11B are diagram illustrating another example of an image displayed on the display of the terminal device.
Figure 11B:
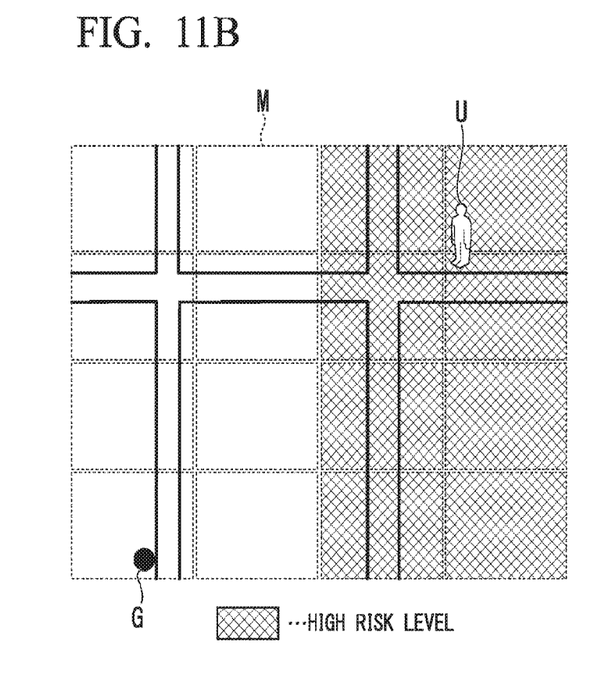

FIGS. 11A and 11B are diagram illustrating another example of an image displayed on the display of the terminal device 50. FIG. 11A is an example of an image before an operation made by a user, and FIG. 11B is an example of an image after an operation is made by a user. In FIG. 11A is information indicating a high cloud risk level and information indicating the developing stage and most-developed stage of the cloud life stages. In this case, if the user makes a prescribed operation with respect to the terminal device 50, a prescribed region of the region displayed on the display of the terminal device 50 is displayed enlarged, as shown in FIG. 11B. A prescribed operation may be, for example, an operation to display enlarged a displayed region, made with respect to the input of the terminal device 50 and, if the display of the terminal device 50 is a touch panel type of display, it may be a pinch-out operation made with respect to the display.

For example, when the prescribed region is displayed enlarged, information indicating the cloud risk levels and/or information indicating the cloud life stages is displayed with regard to each mesh block MB. FIG. 11B is an example of an image that is displayed overlaid onto map information with regard to each mesh block MB and information indicating regions of high cloud risk level. If the image shown in FIG. 11B is displayed on the display of a mobile terminal having a position recognition function such as GPS, the position of the user (mobile terminal) U may be displayed overlaid on the map information. Additionally, if the target location of the mobile terminal is set, the position of the target location G may be displayed overlaid onto the map information.

In this manner, because the cloud regions, the risk levels, and information regarding whether clouds are in the developing, diminishing, or most-developed stage are mutually associated with each other on the display of the terminal device 50, the user can intuitively see the possibility of heavy rain and recognize the risk level. The result is enhanced convenience for the user.

According to the above-described estimation apparatus 20 of the first embodiment, by estimating the cloud developmental stage as developing, diminishing, or most-developed, based on an indicator indicating the change in the altitude of a cloud, it is possible to determine the cloud developmental stage with better accuracy. In addition to the cloud developmental stage, the estimation apparatus 20, based on the indicator of one or both of the altitude or change in the altitude, determines the risk level of a cloud having an determined developmental stage causing heavy rain, and can provide the user with information indicating the estimation result. The result is enhanced convenience for the user.

Although in the above-described embodiment the display data has been described as being displayed on the display of the terminal device 50 or a mobile terminal, the display data may be displayed on the display of a television broadcast receiver, in which case, for example, the display data generator 40 transmits to the receiving unit of a television broadcast receiver a radio signal on which is superimposed information that includes the display data. The receiving unit of the television broadcast receiver receives the radio signals transmitted from the display data generator 40. The television broadcast receiver, based on the information superimposed on the received radio signal, displays information including the display data on its own display.

The network NW2, rather than being a WAN or the like, may be a cable network used in cable broadcasts such as cable TV. In this case, the television broadcast receiver displays the display data on its display unit by communicating with the display data generator 40 via the network NW2. If the television broadcast receiver has an operation unit operatable by the user, if the user makes a prescribed operation with respect to the operation unit, an information requesting signal is transmitted to the display data generator 40. If the display data generator 40 acquires an information requesting signal, it transmits information including display data via the network NW2 to the television broadcast receiver. If information specifying a region is included in the information requesting signal, the display data generator 40 may transmit to the television broadcast receiver information including display data for that region.

(Second Embodiment)

The second embodiment will now be described. Whereas in the first embodiment the estimation apparatus 20, the display data generator 42, and the display data transmitter 44 have been distinctly separate devices from the display data generator 40, the estimation apparatus 20A of the second embodiment differs from that of the first embodiment with regard to the point of including, in addition to the constitution of the estimation apparatus 20 of the first embodiment, a display data generator 34 and a display data transmitter 36. The description to follow focuses on the point of difference.

Figure 12:
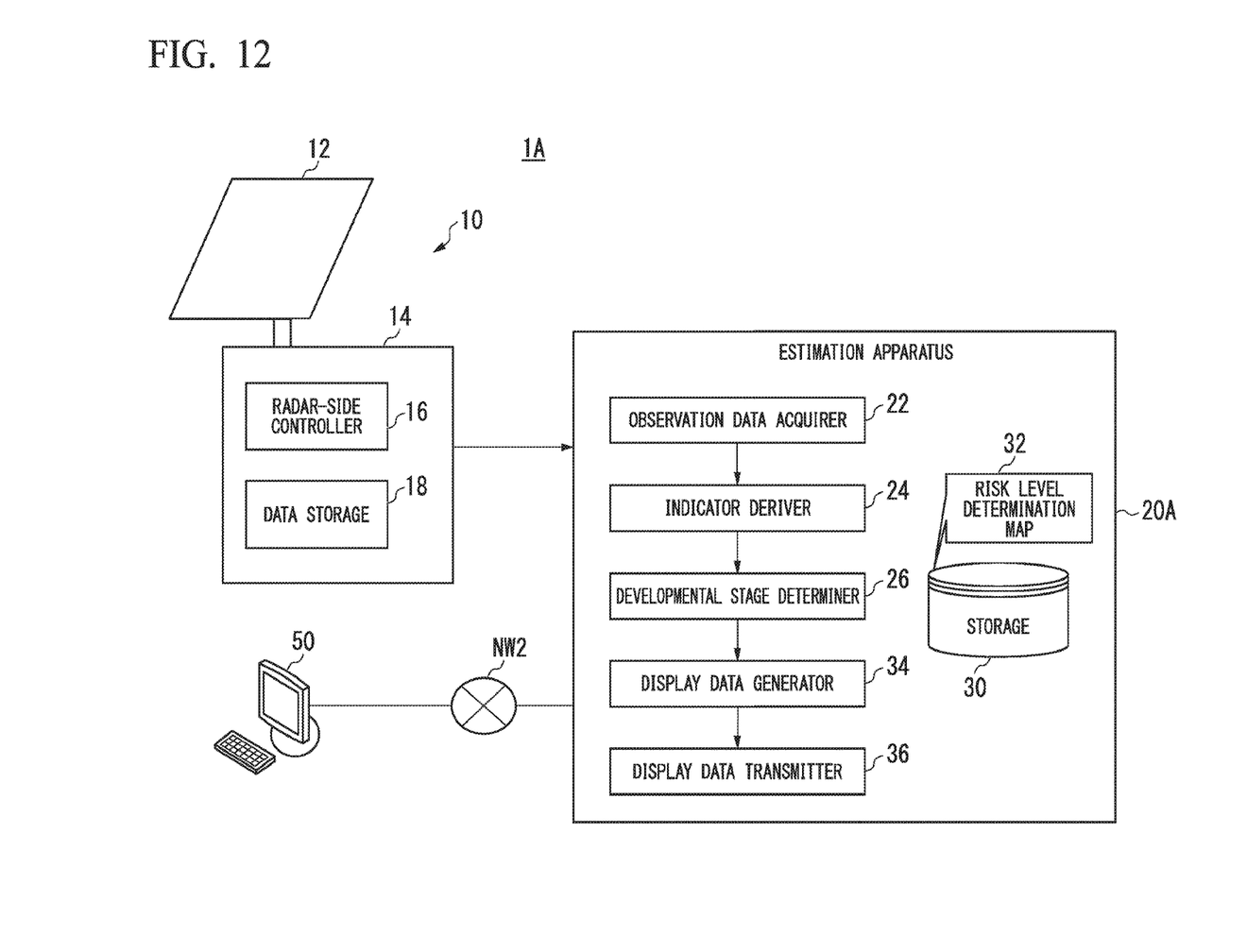
FIG. 12 is a diagram illustrating a constitution of an estimation system.

FIG. 12 is a diagram illustrating the constitution of an estimation system 1A. The estimation system 1A of the second embodiment may include the radar apparatus 10 and the estimation apparatus 20A, but is not restricted to those elements. Also, in the estimation system 1A, the estimation data transmitter 28 is omitted.

The estimation apparatus 20A, in addition to the constitution of the estimation apparatus 20 of the first embodiment, includes the display data generator 34 and the display data transmitter 36. Because the functions of the display data generator 34 and the display data transmitter 36 are the same as the display data generator 42 and the display data transmitter 44 of the first embodiment, the descriptions thereof will be omitted.

According to at least one of the above-described embodiments, by having an acquirer configured to acquire at least first and second sets of time-sequential observation data related to cloud-altitude; and a deriver configured to derive at least a first change in cloud altitude from at least a first altitude at a first time and a second altitude at a second time, the first and second times being different from each other, the first altitude and the second altitude being included in the first set of the time-sequential observation data, and the deriver being configured to derive-a second change in cloud altitude from at least a third altitude at a third time and a fourth altitude at a fourth time, the third and fourth times being different from each other, the third time being different from the first and second times, the fourth time being different from the first and second times, the third altitude and the fourth altitude being included in the second set of the time-sequential observation data; and a determiner configured to determine a cloud developmental stage based at least in part on the first and second changes in cloud altitude, it is possible to determine the cloud developmental stage with better accuracy.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An estimation system comprising:
a meteorological apparatus and an acquirer,
said meteorological apparatus configured to observe atmospheric conditions in which include first and second sets of time-sequential observation data related to cloud-altitude, and transmit the first and the second sets of time-sequential observation data related to cloud-altitude to said acquirer,
said acquirer configured to communicate with the meteorological apparatus, and acquire at least the first and the second sets of time-sequential observation data related to cloud-altitude transmitted by the meteorological apparatus; and
a deriver configured to derive at least a first change in cloud altitude from at least a first altitude at a first time and a second altitude at a second time, the first and second times being different from each other, the first altitude and the second altitude being included in the first set of the time-sequential observation data, and the deriver being configured to derive a second change in cloud altitude from at least a third altitude at a third time and a fourth altitude at a fourth time, the third and fourth times being different from each other, the third time being different from the first and second times, the fourth time being different from the first and second times, the third altitude and the fourth altitude being included in the second set of the time-sequential observation data; and
a determiner configured to determine a cloud developmental stage based at least in part on the first and second changes in cloud altitude,
wherein the acquirer is configured to further acquire third and fourth sets of time-sequential observation data related to cloud-altitude,
the first and second sets of time-sequential observation data are of a first region,
the third and fourth sets of time-sequential observation data are of a second region different from the first region in at least one of latitude and longitude,
the first region includes a plurality of first sub-regions aligned in altitude direction,
the second region includes a plurality of second sub-regions aligned in altitude direction,
the deriver is configured to derive the first and second changes in cloud altitude of the first region,
the deriver is configured to further derive a third change of the second region, from at least a fifth altitude at a fifth time and a sixth altitude at a sixth time, the fifth and sixth times being different from each other, the fifth altitude and the sixth altitude being included in the third set of the time-sequential observation data,
the deriver is configured to further derive a fourth change of the second region, from at least a seventh altitude at a seventh time and an eighth altitude at an eighth time, the seventh and eighth times being different from each other, the seventh altitude and the eighth altitude being included in the fourth set of the time-sequential observation data, and the determiner is configured to determine the cloud developmental stage based at least in part on the first, second, third and fourth changes in cloud altitude.

2. The estimation apparatus according to claim 1, wherein the determiner is configured to determine a cloud-aggregate based at least in part on the first, second, third and fourth sets of time-sequential observation data, the determiner is configured to determine the cloud developmental stage of the cloud-aggregate, based at least in part on the first, second, third and fourth changes in cloud altitude.

3. The estimation apparatus according to claim 1, further comprising:
a data generator configured to generate display-data indicating the cloud developmental stage.

4. The estimation apparatus according to claim 1, wherein the determiner is configured to determine, based at least in part on at least one of: the first, second, third, fourth altitudes, and the first, second, third, and fourth changes in cloud altitude, a level of heavy rain risk associated with the cloud developmental stage for the first region, and based at least in part on at least one of the fifth, sixth, seventh, eight altitudes and the first, second, third and fourth changes in cloud altitude, a level of heavy rain risk associated with the cloud developmental stage for the second region.

5. The estimation apparatus according the claim 4, further comprising:
a data generator configured to generate display-data indicating the level of heavy rain risk.

6. An estimation system comprising:
a meteorological apparatus and an acquirer,
said meteorological apparatus configured to observe atmospheric conditions in which include first and second sets of time-sequential observation data related to cloud-altitude, and transmit the first and the second sets of time-sequential observation data related to cloud-altitude to said acquirer,
the acquirer configured to communicate with the meteorological apparatus, and acquire at least the first and the second sets of time-sequential observation data related to cloud-altitude transmitted by the meteorological apparatus; and
a deriver configured to derive at least a first change in cloud altitude from at least a first altitude at a first time and a second altitude at a second time, the first and second times being different from each other, the first altitude and the second altitude being included in the first set of the time-sequential observation data, and the deriver being configured to derive a second change in cloud altitude from at least a third altitude at a third time and a fourth altitude at a fourth time, the third and fourth times being different from each other, the third time being different from the first and second times, the fourth time being different from the first and second times, the third altitude and the fourth altitude being included in the second set of the time-sequential observation data; and
a determiner configured to determine a cloud developmental stage based at least in part on the first and second changes in cloud altitude,
wherein the first time is prior to the second, third and fourth times, and the second time is prior to the third and fourth times, and the third time is prior to the fourth times,
the determiner is configured to determine that the cloud developmental stage is a cloud developing stage in a case that the determiner determines that the first change is smaller by at least a first threshold than the second change, and
the determiner is configured to determine that the cloud developmental stage is a cloud diminishing stage in a case that the determiner determines that the first change is greater by at least a second threshold than the second change.

7. The estimation apparatus according to claim 6, wherein the determiner is configured to determine that the cloud developmental stage is in a most developed stage in a case that the determiner determines that the difference between the first and second changes in cloud altitude is smaller than a smaller one of the first and second thresholds.

8. An estimation method comprising:
acquiring at least first and second sets of time-sequential observation data related to cloud-altitude; and
deriving at least a first indicator indicating a first change in cloud altitude from at least a first altitude at a first time and a second altitude at a second time, the first and second times being different from each other, the first altitude and the second altitude being included in the first set of the time-sequential observation data;
deriving a second indicator indicating a second change in cloud altitude from at least a third altitude at a third time and a fourth altitude at a fourth time, the third and fourth times being different from each other, the third time being different from the first and second times, the fourth time being different from the first and second times, the third altitude and the fourth altitude being included in the second set of the time-sequential observation data; and
determining a cloud developmental stage based at least in part on the first and second indicators,
wherein the acquiring further acquires third and fourth sets of time-sequential observation data related to cloud-altitude,
the first and second sets of time-sequential observation data are of a first region,
the third and fourth sets of time-sequential observation data are of a second region different from the first region in at least one of latitude and longitude,
the first region includes a plurality of first sub-regions aligned in altitude direction,
the second region includes a plurality of second sub-regions aligned in altitude direction,
the deriving includes,
deriving the first and second changes in cloud altitude of the first region,
deriving a third change of the second region, from at least a fifth altitude at a fifth time and a sixth altitude at a sixth time, the fifth and sixth times being different from each other, the fifth altitude and the sixth altitude being included in the third set of the time-sequential observation data, and
deriving a fourth change of the second region, from at least a seventh altitude at a seventh time and an eighth altitude at an eighth time, the seventh and eighth times being different from each other, the seventh altitude and the eighth altitude being included in the fourth set of the time-sequential observation data, and
the determining includes determining the cloud developmental stage based at least in part on the first, second, third and fourth changes in cloud altitude.

* * * * *